June 27, 1961 K. D. LEE 2,989,967
CAR SIDE TENT
Filed April 3, 1959 3 Sheets-Sheet 3
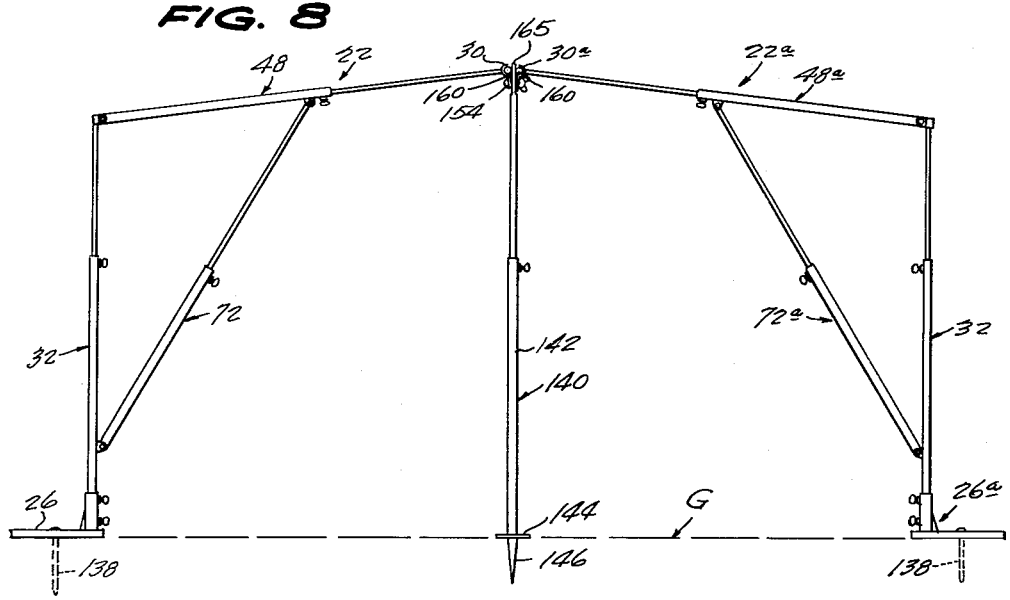
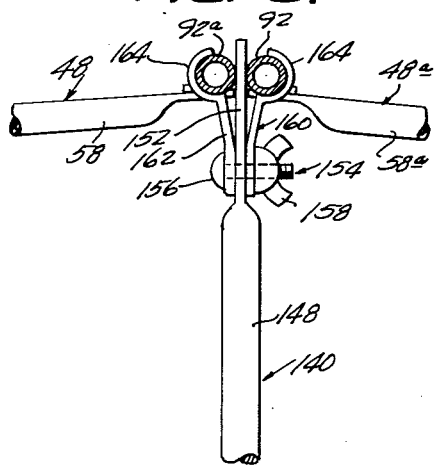
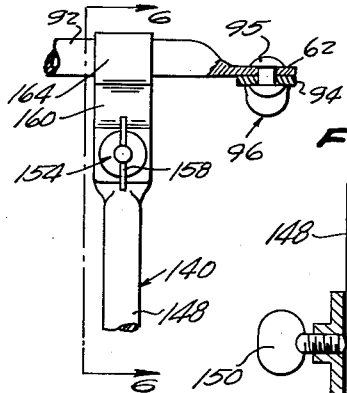
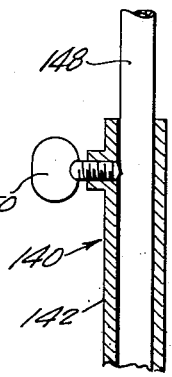
INVENTOR.
KENNETH D. LEE,
BY
*McMorrow, Berman & Davidson*
ATTORNEYS.

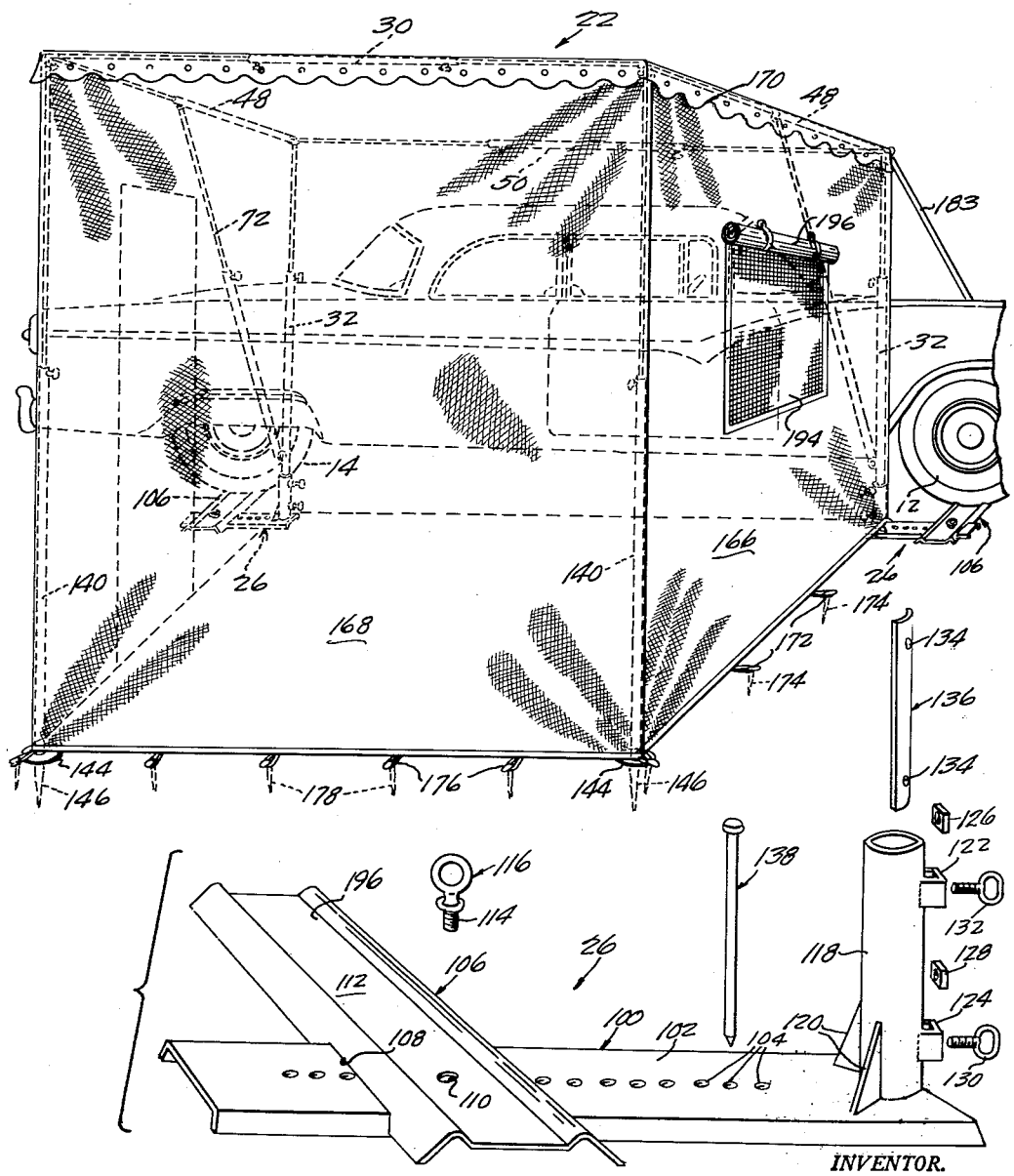

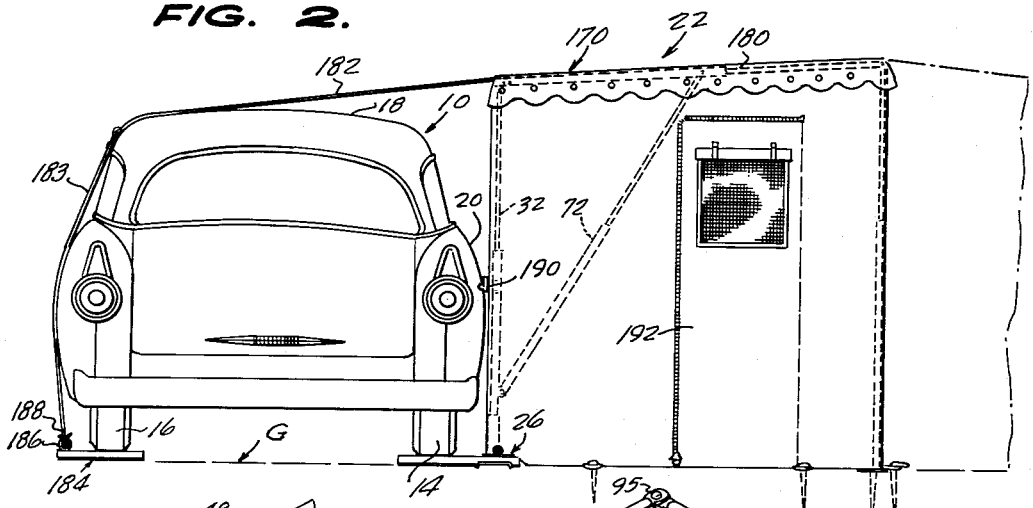
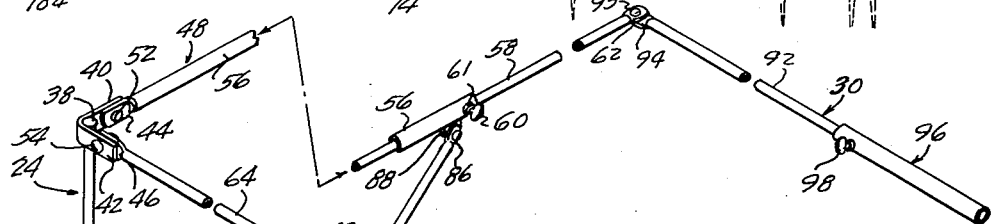
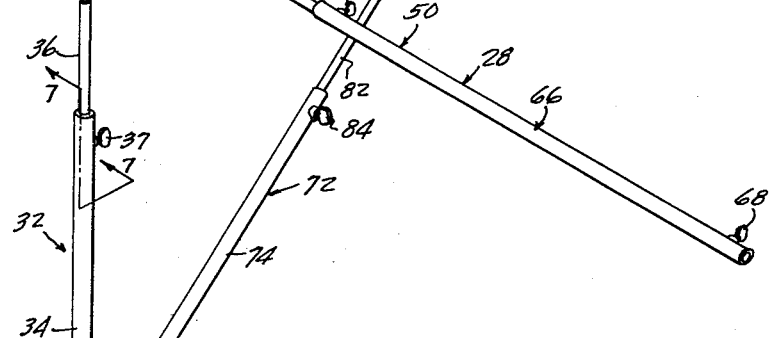

United States Patent Office 2,989,967
Patented June 27, 1961

2,989,967
CAR SIDE TENT
Kenneth D. Lee, 813 E. Jackson, Harlingen, Tex.
Filed Apr. 3, 1959, Ser. No. 803,883
2 Claims. (Cl. 135—1)

This invention relates to an improved knock-down and portable shelter adapted to be erected on the ground at one side of an automobile and having components anchored by wheels of the automobile and components which bear supportably on the automobile.

The primary object of the invention is to provide a lower cost, more practical, more efficient tent of this kind which is more easily erected and taken down and collapsed, and which when in knocked down condition makes up into a compact bundle which can be stored in the trunk compartment of an automobile to occupy minimum space therein.

Another object of the invention is to provide, in a tent of the character indicated above, whose supporting framework is uncomplex and light weight, and is composed of a small number of simple and easily assembled parts, and which has components which are designed to serve as supports and connectors for erecting another similar framework for producing a double size tent.

A further object of the invention is to provide, in a tent of the character indicated above, novel and improved automobile wheel held anchor means which serve as bases for vertical members of the framework.

Other important objects and advantageous features of the invention will be apparent from the following description and the accompanying drawings, wherein, for purposes of illustration only, a specific form of the invention is set forth in detail.

In the drawings:

FIGURE 1 is a rear perspective view showing a single tent of the invention erected at the side of an automobile;

FIGURE 2 is an end elevation taken from the left of FIGURE 2;

FIGURE 3 is an enlarged exploded perspective view of a wheel anchor assembly and associated parts;

FIGURE 4 is an enlarged and contracted perspective view showing one side frame and associated front and rear cross members;

FIGURE 5 is an enlarged fragmentary elevation, partly in section, showing a rear frame upright and an associated cross member;

FIGURE 6 is a transverse vertical section taken on the line 6—6 of FIGURE 5, showing two such cross members associated with the upright, as in FIGURE 8;

FIGURE 7 is an enlarged fragmentary vertical transverse section taken on the line 7—7 of FIGURE 4; and FIGURE 8 is an end elevation showing two frameworks secured together and providing a double size tent.

Referring in detail to the drawings, wherein like numerals designate like parts throughout the several views, and first to FIGURE 1 to 7, the numeral 10 generally designates a conventional form of passenger automobile having an outer or second side along which are front and rear wheels 12 and 14, and a first side 20 along which are wheels 16, a roof 18. Associated with these parts of the automobile 10 is shown a single tent in accordance with the present invention, which is generally designated 22.

The tent 22 comprises a rigid metal framework which consists of two similar side or end frames 24, two similar wheel anchor assemblies 26, and front and rear cross bars 28 and 30, respectively, which extend between the frames 24.

Each side frame 24 comprises a front upright 32 which is composed of a lower tube 34 into whose upper end is slidably and telescopically engaged an upper rod or tube 36 lockable in place by a thumb screw 37 in the tube. Fixed in suitable manner on the outer side of the upper rod 36 at its upper end 38 is an angle element having flat arms 40 and 42 with whose laterally inward sides are engaged flats 44 and 46 on the adjacent ends of a normally horizontal end or side bar 48 and a front cross bar 50, respectively, the flats being pivotally secured to the arms by suitable means, such as headed rivets 52 and 54, respectively.

The side bar 48 consists of a front tube 56 into whose rear end is slidably telescoped a rear rod 58, which is secured in selected position in the tube 56 by means of a thumb set screw 60 threaded in a nut 61 fixed on the side of the tube and registered with a hole in the tube. The rear rod 58 terminates at its rear end in a horizontal flat 62.

The front cross bar 28 consists of a rod 64 having the mentioned flat 46 on its outer end, the rod 64 being slidably telescoped into the adjacent end of a connecting tube 66 having therein a thumb screw 68 at the related end for locking the rod 64 in place therein. The tube 66 has another thumb screw 68 at its other end for similarly locking therein the front cross bar rod 64 of the other frame 24 when the framework is set up.

The frame 24 further comprises a diagonal brace bar 72 which consists of a tube 74 which has a flat 76 on its lower end which is pivotally secured, as by means of a headed rivet 78 to an ear 80 fixed on the tube 34 of the front upright 32 at a point spaced below the upper end of the tube 34, and a rod 82 which is slidably telescoped into the upper end of the tube 74 and is locked in place by a thumb screw 84 in the tube 74. The upper end of the rod 82 terminates in a flat 86 which is engaged with the inward side of an ear 88 depending from the tube 56 of the end bar 48 near the rear end thereof. It will be obvious from the foregoing that, with the thumb screws loosened, the rods can be pulled out of the related tubes, so that the parts can be separated and the rods 36 and 64 and the tube 56 and the tube 74 folded alongside of the front upright 32, with the loose parts laid thereon, so as to form a compact and easily stored bundle.

The frame 24 further comprises a rear cross bar 30 which consists of a rod 92 having a flat 94 on its outer end which is engaged with the underside of the flat 62 on the rear end of the end bar rod 58 and pivoted thereto, as by a headed rivet 95. The rear cross bar rod 92 is slidably telescoped into the related end of a rear cross bar connector tube 96 and is lockable therein by means of a thumb screw 98 in the adjacent end of the connector tube. The other end of the connector tube 96 has a similar thumb screw for locking therein the rod 92 of the other frame 24 of the framework.

The frames 24 are mounted on anchor assemblies 26, each of which comprises, as shown in FIGURE 3, a longitudinally elongated and inverted channel base 100 having a web 102 in which is formed a longitudinal row of threaded holes 104. An elongated wheel tread channel plate 106 lies across and is slidable along the channel base 100 and has notches 108 in its side flanges which embrace the channel base. A hole 110 in the web 112 of the tread plate 106 is provided to pass the threaded shank 114 of an eye bolt 116, into threaded engagement with a selected one of the holes 104 of the base 100, for securing the tread plate 106 on the base in a selected position corresponding to the wheel base or the distance between the front and rear wheels of the automobile 10.

On one end of the base web 102 is fixed, by suitable means, an upstanding vertically elongated socket 118 which is reinforced by gusset plates 120 secured to the web 102. On the outer side of the socket 118 there are fixed, by suitable means, upper and lower U-shaped holders 122 and 124, for replaceable squared nuts 126 and 128 engaged therein and positioned in line with holes in the holders to pass thumb screws 130 and 132, respectively, threadably through the nuts and through openings provided in the side wall of the socket 118. Inside of the socket 118 the screws 130 and 132 seat in recesses 134 in the convex outer side of a vertically elongated concave-convex wedge or clamping plate 136 which is employed to join in the socket line 118 the lower end of the tube 34 of the related front upright 32.

To provide for anchoring the channel bases 100 to the ground, without the use of automobile wheels, so where an automobile is not available, or where another tent is erected at the rear of a single tent, as shown in FIGURE 8, there are provided headed spikes 133 which are adapted to be passed down through holes 104 of the base 100 and driven into the ground.

Each frame 24 comprises a rear upright 140 which consists of a lower tube 142 having a wide annular ground-engaging stop flange 144 at its lower end above a ground-piercing spike 146. Slidably telescoped in the upper end of the tube 142 is a rod 148 which is locked in place by a thumb screw 150 in the upper end of this tube. The rod 148 terminates at its upper end, as shown in FIGURES 5 and 6, in a flat 152 through whose lower part extends a clamping bolt 154 having a head 156 and a wing nut 158. Vertically elongated clamping plates 160 are disposed at opposite sides of the flat 152 and have shanks 162 which are traversed by the bolt 154 and which have on their upper ends semi-circular laterally inwardly facing jaws 164. As seen in FIGURE 6, in a single tent set-up the rods 92 of the rear cross bar 30 at the outer ends thereof near the rear uprights 140 are clamped by a related jaw 164 against the side of the flat 152 by tightening the bolt 154, and that, in the case of a double tent set-up, the same rods of the frames 24a of the second tent 22a are similarly clamped to the other side of the flat 152, as shown in FIGURE 8. As shown in FIGURES 2 and 8, the end bars 48 of the frames 24 are positioned at an upward and rearward angle relative to the front uprights 32 and the ground, and that, as a consequence, the rear uprights 140 are adjusted to greater heights than the front uprights 32. In the case of a double tent set-up, as shown in FIGURE 8, this arrangement produces a transverse ridge 165 across the center of the double tent.

Flexible sheet material coverings to provide the roof, back, and sides of the tent 22, preferably comprise end or side panels 166, and back panel 168, and a roof panel 170. The end panels 166 are releasably secured in suitable manner at their side edges to the front and rear uprights 32 and 140 and at their upper edges to the ends bars 48 of the frames 24. On their lower edges the side panels have spaced therealong tent peg loops 172, through which suitable hooked tent pegs 174 are driven into the ground. The back panel 168 is similarly secured to the rear uprights 140 and to the rear cross bar 30, and has tent peg loops 176 along the lower edge in conjunction with tent pegs 178.

The roof panel 170 includes a section 180 which is releasably secured in suitable manner at its rear edge over and to the rear cross bar and at its side edges over and to the frame end bars 48, and a second section 182 which is long enough to reach to the ground from the front uprights 32 in the case of a double tent. In the case of a single tent the section 182 is passed over the automobile roof 18, and ropes 183 therefrom extend down along the second side of the automobile, to the ground G thereat. Here there are provided for anchoring the ropes 183, automobile wheel tread anchors 184 which are generally similar to the plates 106 of the anchor assemblies 26, and have therein eye bolts 186 to which ties 188 on the ropes are secured. The section 182 provides a roof over the space between the inboard side 20 of the automobile 10 and the open front of the tent 22.

Suitable non-marring and cushioned bumpers 190 are mounted on the front uprights 32 to supportably bear against the inboard side 20 of the automobile, as shown in FIGURE 2, so as to preclude tilting of the frames 24 in the direction of the automobile when the roof panel is tightened.

A zipper closed door 192 can be provided in either or both of the side panels 166, and/or a screened window 194 having a roll-up storm panel 196.

In the double tent set-up shown in FIGURE 8, the second tent 22a is erected behind the single tent 22 and its rear cross bar 30a clamped to the rear cross bar 30 of the single tent in a manner hereinabove described.

It will be evident that erection of a single tent 22 begins with the proper laying out of the anchor assemblies 26 and of the tread anchors 184 and the placement of the related automobile wheels thereon by running the automobile thereover until the wheels drop into the depressions 196 in the plates 106 and the tread anchors 184. Thereafter the front uprights 32 are put in place in the sockets 118 and the various tubes and rods properly extended and locked in position. Guide means for proper extension of the rods and tubes can conveniently be in the form of colored rings (not shown) painted on the rods.

Although there has been shown and described herein specific forms of my invention, it is to be understood that any changes or change in the structures and in the relative arrangements of the components are contemplated as being within the spirit and scope of the invention as defined by the claims appended hereto.

What is claimed is:

1. In combination, an automobile having a roof and first and second sides, wheels at said sides, a tent framework located at said first side, said framework comprising a pair of rigid and collapsible side frames having front and rear uprights, means for anchoring the rear uprights to the ground, ground-engaging wheel anchor assemblies comprising first members on which front uprights are rigidly supported in erect positions, and second members secured to said first members upon which wheels at said first side of the automobile rest, a tent covering stretched between and secured to said side frames and said first and rear uprights, said covering having a panel reaching across and bearing upon the automobile roof, and down along said second side of the automobile, other ground-engaging anchors upon which wheels at the second side of the automobile rest, and tie means extending between and connected to the anchors and the panel.

2. In combination, an automobile having a roof and first and second sides, wheels located at said sides, a tent framework comprising a pair of rigid and collapsible side frames having front and rear uprights, ground-engaging wheel anchor assemblies comprising first members upon which the front uprights are rigidly mounted in erect positions and second members secured to the first members upon which the wheels at the first side of the automobile rest, said first anchor members having upstanding sockets thereon into which the lower ends of the front uprights are securably engaged, said second anchor members being slidably supported on said first anchor members, said second members being slidably adjustable on the first members toward and away from each other to space the second members to receive the wheels at the first side of the automobile thereon, and means for fixing the second members in adjusted positions on the first members.

References Cited in the file of this patent

UNITED STATES PATENTS

| 1,483,741 | Moffett | Feb. 12, 1924 |
| 1,623,507 | Thurtle | Apr. 5, 1927 |
| 2,480,509 | Ripley | Aug. 30, 1949 |